United States Patent
Lear et al.

(10) Patent No.: US 11,902,277 B2
(45) Date of Patent: *Feb. 13, 2024

(54) SECURE MODIFICATION OF MANUFACTURER USAGE DESCRIPTION FILES BASED ON DEVICE APPLICATIONS

(71) Applicant: Cisco Technology, Inc., San Jose, CA (US)

(72) Inventors: Eliot Lear, Wetzikon (CH); Christopher S. Steck, Seattle, WA (US); Brian Weis, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 17/235,284

(22) Filed: Apr. 20, 2021

(65) Prior Publication Data

US 2021/0288962 A1 Sep. 16, 2021

Related U.S. Application Data

(63) Continuation of application No. 15/954,875, filed on Apr. 17, 2018, now Pat. No. 11,025,628.

(51) Int. Cl.
*H04L 9/40* (2022.01)
*H04L 9/32* (2006.01)

(52) U.S. Cl.
CPC ............ *H04L 63/10* (2013.01); *H04L 9/3263* (2013.01); *H04L 63/20* (2013.01); *H04L 63/101* (2013.01)

(58) Field of Classification Search
CPC ....... H04L 63/10; H04L 9/3263; H04L 63/20; H04L 63/101
See application file for complete search history.

(56) References Cited

U.S. PATENT DOCUMENTS

| | | | |
|---|---|---|---|
| 6,324,685 B1 * | 11/2001 | Balassanian | G06F 9/44526 717/146 |
| 8,312,262 B2 | 11/2012 | Mauro, II et al. | |

(Continued)

OTHER PUBLICATIONS

E. Lear et al., "Manufacturer Usage Description Specification", draft-ietf-opsawg-mud-05, Network Working Group, IETF Trust, Mar. 8, 2017, 41 pgs.

(Continued)

*Primary Examiner* — Ghodrat Jamshidi
(74) *Attorney, Agent, or Firm* — Edell, Shapiro & Finnan, LLC

(57) ABSTRACT

Techniques for providing secure modification of manufacturer usage description (MUD) files based on device applications are provided. In one embodiment, a method for secure modification of MUD files may include obtaining a request for one or more applications from a device. The method also includes providing to the device the one or more applications and a certification that includes an updated MUD identifier determined based on the one or more applications requested. The updated MUD identifier is associated with a concatenated MUD file that comprises individual MUD file portions for each of the one or more applications requested. The device is configured to request an updated device identifier using the certification. The updated device identifier includes the updated MUD identifier that is associated with the concatenated MUD file.

20 Claims, 7 Drawing Sheets

(56) References Cited

U.S. PATENT DOCUMENTS

| | | | |
|---|---|---|---|
| 8,370,905 B2 | 2/2013 | Sangubhatla | |
| 8,601,247 B2 | 12/2013 | Srinivasan et al. | |
| 9,602,292 B2 | 3/2017 | Ramatchandirane | |
| 9,680,872 B1* | 6/2017 | Roth | H04L 9/3263 |
| 9,819,682 B2 | 11/2017 | Dabbiere et al. | |
| 9,954,848 B1 | 4/2018 | Stoica et al. | |
| 10,291,477 B1* | 5/2019 | Askar | H04W 4/50 |
| 10,574,466 B1* | 2/2020 | Gopalakrishnan | H04L 9/3242 |
| 2002/0144108 A1* | 10/2002 | Benantar | H04L 9/3263 |
| | | | 713/156 |
| 2005/0188220 A1 | 8/2005 | Nilsson et al. | |
| 2005/0192099 A1* | 9/2005 | Nguyen | G07F 17/3232 |
| | | | 463/42 |
| 2006/0200814 A1* | 9/2006 | Kontinen | G06F 8/61 |
| | | | 717/168 |
| 2011/0276803 A1 | 11/2011 | Bender et al. | |
| 2012/0137372 A1* | 5/2012 | Shin | H04L 9/0897 |
| | | | 726/26 |
| 2013/0191894 A1* | 7/2013 | Eydelman | H04L 63/0823 |
| | | | 726/8 |
| 2014/0052993 A1* | 2/2014 | Isozaki | H04L 63/0428 |
| | | | 713/175 |
| 2015/0026826 A1 | 1/2015 | Allegri et al. | |
| 2015/0083224 A1 | 3/2015 | Beckman et al. | |
| 2015/0089224 A1 | 3/2015 | Beckman et al. | |
| 2016/0013948 A1 | 1/2016 | Moses | |
| 2016/0179409 A1* | 6/2016 | Simacek | G06F 3/067 |
| | | | 711/160 |
| 2016/0248746 A1* | 8/2016 | James | H04L 67/12 |
| 2017/0033984 A1* | 2/2017 | Lear | H04L 41/0893 |
| 2018/0062860 A1 | 3/2018 | Gajjala et al. | |
| 2018/0152564 A1* | 5/2018 | Lang | H04M 15/00 |
| 2018/0159894 A1 | 6/2018 | Reddy et al. | |
| 2018/0234255 A1 | 8/2018 | Fu | |
| 2018/0352042 A1 | 12/2018 | Neuenschwander et al. | |
| 2019/0052658 A1 | 2/2019 | Clarke et al. | |
| 2019/0095587 A1 | 3/2019 | Warner et al. | |

OTHER PUBLICATIONS

M. Pritikin, et al., "Bootstrapping Remote Secure Key Infrastructures (BRSKI)", draft-ietf-anima-bootstrapping-keyinfra-09, Anima WG, IETF, Oct. 30, 2017, 58 pgs.

E. Lear, et al., "Manufacturer Usage Description Specification," draft-ietf-opsawg-mud-11, Network Working Group, Internet-Draft, Intended status: Standards Track, Sep. 20, 2017, 54 pages.

* cited by examiner

SECURE MODIFICATION OF MANUFACTURER USAGE DESCRIPTION FILES BASED ON DEVICE APPLICATIONS

CROSS-REFERENCE TO RELATED APPLICATION

This application is a continuation application of U.S. patent application Ser. No. 15/954,875, filed on Apr. 17, 2018, entitled "SECURE MODIFICATION OF MANUFACTURE USAGE DESCRIPTION FILES BASED ON DEVICE APPLICATIONS," the entirety of which is hereby incorporated by reference.

TECHNICAL FIELD

This disclosure relates to using manufacturer usage descriptions to control network access of devices in a network.

BACKGROUND

An enterprise network connects computers and other devices within the network. Access to other networks, computers, or devices outside of the enterprise network is typically limited and controlled. Authorization for access outside of the enterprise network can be managed by access points, firewalls, or similar authorization devices that allow or deny access to/from devices on the network. Authorization may be implemented by using a policy that defines rules for specifying devices, types of access, and/or destinations that are permitted and/or prohibited for access outside of the enterprise network.

Some network devices can have predetermined usage descriptions that specify the description of the role of the device and various policies governing the behavior and permissions of the device. Predetermined usage descriptions can be referred to as being "manufacturer-driven" or "manufacturer-based" usage descriptions (MUDs) because they may indicate the manufacturer's operational requirements and/or intent for the corresponding network device.

DESCRIPTION OF EXAMPLE EMBODIMENTS

Overview

Figure 1:
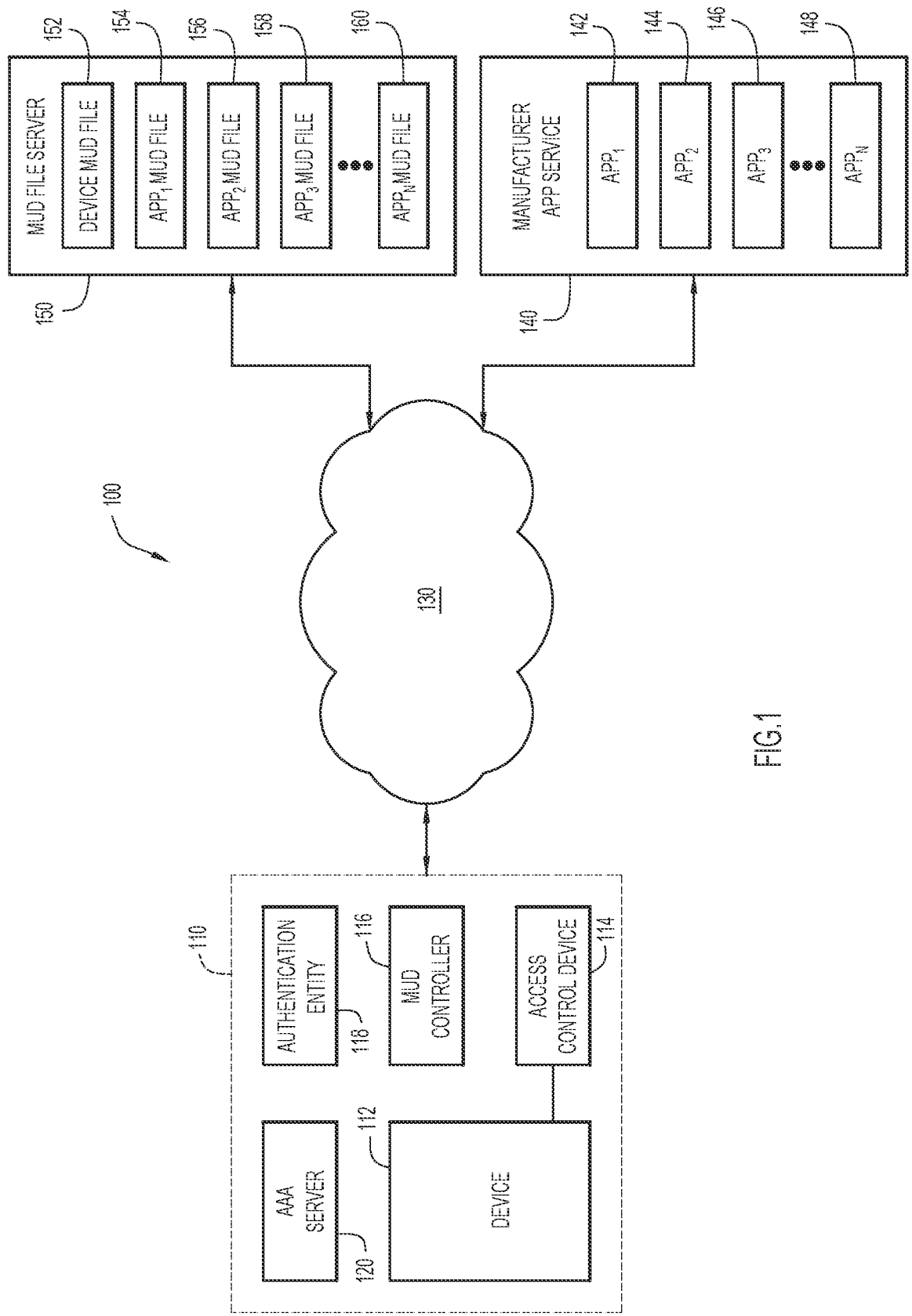
FIG. 1 is a block diagram illustrating a system for implementing secure modification of manufacturer usage description (MUD) files based on device applications, according to an example embodiment.

Presented herein are techniques for providing secure modification of MUD files based on device applications. In an example embodiment, a method for secure modification of MUD files may include obtaining (receiving) a request for one or more applications from a device. The method also includes providing (transmitting) to the device the one or more applications and a certification that includes an updated MUD identifier determined based on the one or more applications requested. The updated MUD identifier is associated with a concatenated MUD file that comprises individual MUD file portions for each of the one or more applications requested. The device is configured to request an updated device identifier using the certification. The updated device identifier includes the updated MUD identifier that is associated with the concatenated MUD file.

Example Embodiments

Manufacturer usage descriptions (MUD) provide a mechanism for a device manufacturer to embed a Uniform Resource Identifier (URI) in the device at the time the device is manufactured. During the device installation or onboarding in a network, the URI is emitted by the device to the appropriate entity in the network. The URI resolves or links to the device manufacturer's MUD file server to retrieve an associated MUD file for the device. The MUD file contains policies about the device that are defined by the device manufacturer. Typically, these policies include an access control policy that the network can use to create access control lists that restrict access (i.e., communication to and/or from) for the device to traffic that has been approved by the device manufacturer.

One way that the URI may be embedded with the device during manufacturing is within an X.509 certificate. An X.509 certificate is a digital certificate that uses the widely accepted international X.509 public key infrastructure (PKI) standard to verify that a public key belongs to the user, computer or service identity contained within the certificate. The standard is defined in Section 10 of The Internet Engineering Task Force (IETF) publication draft-ietf-opsawg-mud-11, which publication is hereby incorporated by reference in its entirety. When a device emits an X.509 certificate containing a MUD URI, the network infrastructure can resolve the MUD URI, and, if acceptable to the network, install the defined access control policy on a switch access port connected to the device before the port is opened to the network. This process ensures that all of the data packet traffic to and/or from the device will be subject to the access control policy.

However, one constraint on using manufacturer-embedded certificates (e.g., X.509 certificates) is that the certificate is not designed to change. Devices that are intended to be very constrained may not need any changes to their manufacturer-defined policies identified by the MUD URI from their embedded certificates. Multi-purpose devices, however, may have their intended behavior change based on the installation of new applications that provide new, different, and/or additional features to a device. Additionally, some Internet-of-Things (IoT) devices may be authorized by the IoT device manufacturer to download or install new applications from third parties after the IoT device has been onboarded or installed on the network. Accordingly, in these situations, the functionality associated with the newly installed applications on the device may not be permitted by the original policy identified by the MUD URI in the device's embedded certificate.

According to the principles of the example embodiments described herein, techniques for secure modification of a device's MUD file based on the applications that are installed on the device are provided. With these techniques, when applications are downloaded or installed at a device, a new MUD file and a new or substitute certificate for the device may be provided. In the example embodiments, rather than relying upon the network infrastructure to actively manage the installed applications and/or certificates, a trusted application provider or service may be configured to securely provide both the applications and a new embedded certificate that contains a new MUD URI that identifies a policy for the device that allows the appropriate access control to enable the functionality provided by the newly installed applications.

With reference made first to FIG. 1, FIG. 1 is a diagram showing an example of a system 100 in which techniques for providing secure modification of MUD files based on device applications may be implemented. In this embodiment, system 100 includes an enterprise network 110 that may communicate over a communication network 130 with remote devices, including at least a manufacturer application service 140 and a MUD file server 150. The enterprise network 110 includes at least one network device 112 (also referred to as device 112), an access control device 114, a MUD controller 116, an authentication entity 118, and an authentication, authorization, and accounting (AAA) server 120. In this embodiment, enterprise network 110 is shown including a single network device 112. In other embodiments, however, enterprise network 110 may include various additional network devices.

The term "network device" is meant to be interpreted broadly. For example, network devices may include various client devices employed by users within enterprise network 110. Some examples of network devices may include cameras, interactive whiteboards, conference phones, smartphones, light bulbs and fixtures, outlets, televisions, media players, hubs or gateways, IoT devices, any device with network connectivity that may include sensors and/or actuators, or any other device with network connectivity and which performs a sensing, actuating or other function, and may also include instances of virtual machines or applications. However, one of ordinary skill in the art would readily recognize that the network device may be any type of device now known or hereinafter developed. Additionally, one of ordinary skill in the art would readily recognize that other network-capable devices may also be in enterprise network 110.

Device 112 may be connected to an access control device 114. Access control device 114 can be configured to permit or prohibit device 112 from communicating with other devices within enterprise network 110 and/or other devices outside of enterprise network 110, for example, over communication network 130. Some examples of access control device 114 may include an access point, switch, router, firewall, or other network security or authorization device that allows or denies access to/from devices on enterprise network 110.

In an example embodiment, access control device 114 may be in communication with a MUD controller 116. MUD controller 116 may be configured to implement various network security policies to devices on enterprise network 110, including establishing a policy to access control device 114 for one or more network devices, including device 112. A policy for device 112 may be based on predefined usage descriptions, such as those included in a MUD file, as described in more detail below. In some cases, MUD controller 116 may receive instructions, or request approval, from a network administrator for enterprise network 110. For example, in some embodiments, AAA server 120 may provide authentication and authorization functions for enterprise network 110.

Enterprise network 110 can be configured to communicate with one or more remote computers and/or devices over communication network 130. Communication network 130 may be, for example, a local access network (LAN) or wide area network (WAN). Also, communication network 130 may be either wired, wireless, or a combination of wired and wireless. In an example embodiment, communication network 130 may be the Internet.

MUD controller 116 may be configured to implement one or more policies that provide rules regarding communication over communication network 130 by computers and/or devices on enterprise network 110. For example, a policy implemented by MUD controller 116 may provide rules that restrict access to or from device 112 outside of enterprise network 110. In some cases, access may also be restricted between various network devices within enterprise network 110. The MUD controller 116 is in communication with a MUD file server 150, via communication network 130. According to the principles of the example embodiments, MUD file server 150 may store a plurality of MUD files associated with devices (e.g., a MUD file 152 associated with device 112) as well as a plurality of MUD file portions (e.g., MUD file portions 154, 156, 158, 160) associated with different applications that may be installed on devices. For example, a device manufacturer application service 140 or another trusted third-party application service provider may be configured to provide applications for a device (e.g., applications 142, 144, 146, 148). The interactions between MUD controller 116, manufacturer application service 140, and MUD file server 150 are described in further detail below.

Manufacturer application service 140 includes a plurality of applications that may be downloaded or installed by a device to enable new, different, and/or different functionality for the device. In some embodiments, manufacturer application service 140 may be provided by a device manufacturer. In other embodiments, manufacturer application service 140 may be provided by a trusted third-party application service provider. In this embodiment, the plurality of applications that may be provided by manufacturer application service 140 include a first application 142 ($App_1$), a second application 144 ($App_2$), a third application 146 ($App_3$), and continuing for any additional number up to an nth application 148 ($App_N$). In an example embodiment, manufacturer application service 140 may be a server or other apparatus configured to provide applications for various devices, for example, as shown in reference to FIG. 7 described below.

Additionally, in some embodiments, applications for a device may be provided through a private network, for example, via an enterprise application service. In such situations, a MUD file server for the private network may also be available to the enterprise application service for storing MUD files and MUD file portions for the devices and/or applications associated with the enterprise application service, according to the principles of the embodiments described herein.

As described in the example embodiments, MUD controller 116 may implement rules based on predefined usage descriptions for network devices. Predetermined usage descriptions can specify a description of the role of a device and various policies governing the behavior and network access permissions of the device. Such predetermined usage descriptions may be provided by the device's manufacturer in a MUD file. In a MUD file, the device's manufacturer explicitly describes the device and network access rules associated with the device (i.e., what its expected behavior is), such as in a standard eXtensible Markup Language (XML) or JavaScript Object Notation (JSON) Data Interchange Format file format. MUD controller 116 may create a security policy for the device described in the manufacturer's MUD file. For example, the MUD file may indicate that certain approved communications are allowed and all other communications are denied. MUD controller 116, upon approval from the network administrator and/or AAA server 120, may then merge the rules obtained from the MUD file into the existing network policies for enterprise network 110.

In some embodiments, AAA server 120 may be optional. In addition, in other embodiments, functions of MUD controller 116 and AAA server 120 may be combined in a single apparatus or device.

The MUD controller 116 can retrieve MUD files from the MUD file server 150. For example, device 112 can provide MUD controller 116 with a MUD identifier, such as a Uniform Resource Identifier (URI), that links to the device manufacturer's MUD file server 150 to retrieve the associated MUD file (e.g., MUD file 152 for device 112). Accordingly, MUD controller 116 may retrieve one or more MUD files from MUD file server 150. Each MUD file or MUD file portion may have usage descriptions for specific network devices or specific applications that are to be installed on devices. For example, as shown in FIG. 1, MUD file server 150 includes device MUD file 152 containing predefined usage descriptions for device 112, as well as a plurality of MUD file portions, including a first MUD file portion 154 containing predefined usage descriptions for first application 142 (App$_1$), a second MUD file portion 156 containing predefined usage descriptions for second application 144 (App$_2$), a third MUD file portion 158 containing predefined usage descriptions for third application 146 (App$_3$), and continuing for any additional number up to an nth MUD file portion 160 containing predefined usage descriptions for nth application 148 (App$_N$).

Additionally, enterprise network 110 may also include authentication entity 118. Authentication entity 118 may be a server or other device that is configured to issue certificates to devices on enterprise network 110. For example, in one embodiment, authentication entity 118 may be a Bootstrapping Remote Secure Key Infrastructures (BRSKI) registrar that is configured to issue X.509 certificates or provide other identity certification. In this example embodiment, authentication entity 118 may be part of enterprise network 110. However, in other embodiments, authentication entity 118 may be a remote server or remote device that communicates with enterprise network 110 over communication network 130. For example, functions of authentication entity 118 may also be provided by a device manufacturer service or another trusted third party application service provider that has been trusted to issue certificates or other identity certification.

Figure 2:
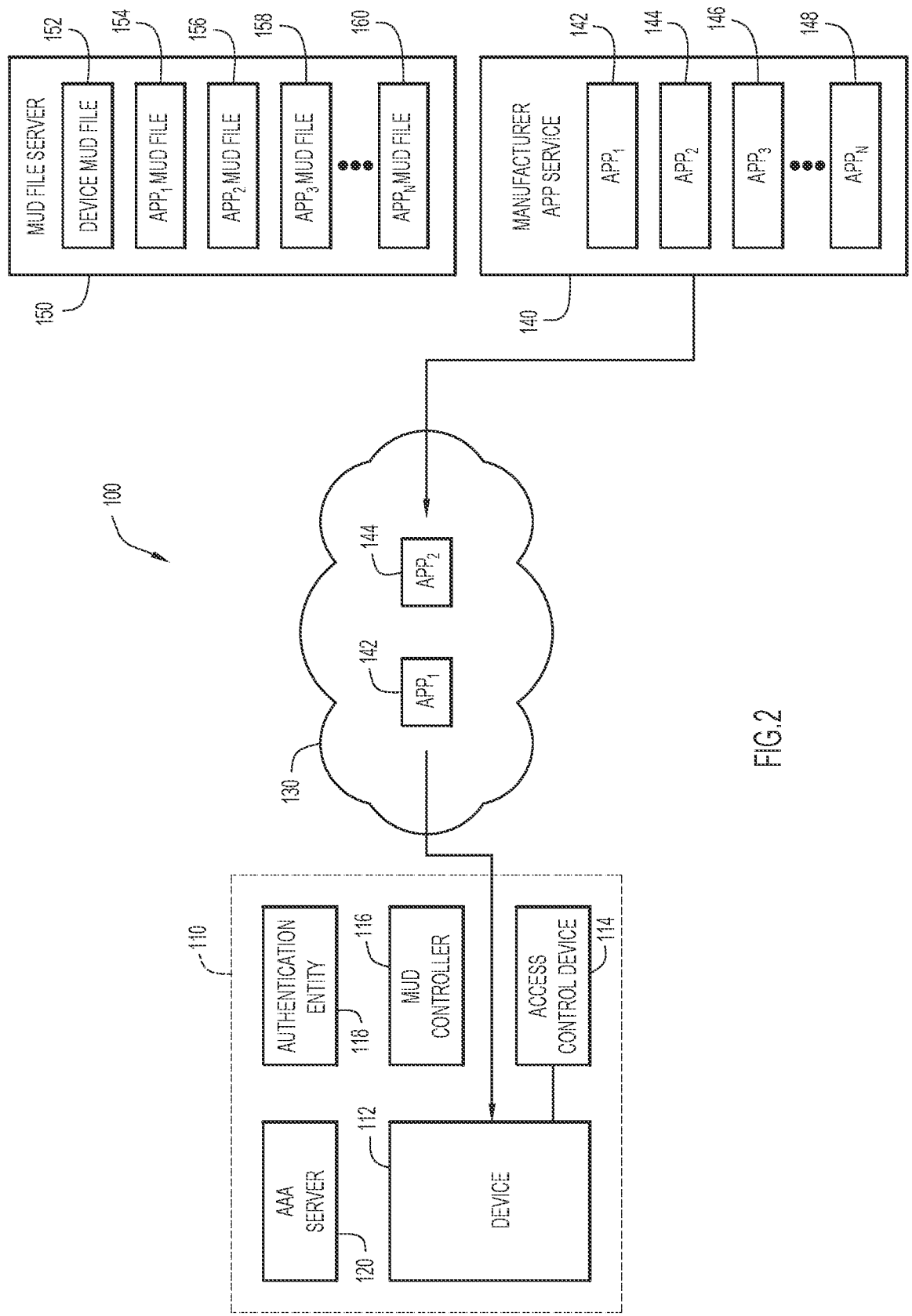
FIG. 2 is a functional diagram illustrating a device requesting applications from a manufacturer application service, according to an example embodiment.

Referring now to FIG. 2, a functional diagram illustrating device 112 requesting one or more applications from manufacturer application service 140 is shown according to an example embodiment. In some embodiments, device 112 may request to download or install one or more applications from manufacturer application service 140. In this embodiment, device 112 may request to download or install first application 142 (App$_1$) and second application 144 (App$_2$) from manufacturer application service 140. For example, IoT devices based on a particular operating system may request to download or install applications from the corresponding application store for that operating system. In another example, an IoT gateway device may install applications to assist in managing sensors or other devices attached to the gateway that are provided from the manufacturer and/or from third parties through a manufacturer or manufacturer-approved application service provider.

According to the principles of the example embodiments, manufacturer application service 140 or other trusted third party application service provider has information about the current state of devices that it supports and the applications that are installed on those devices. For example, when device 112 requests to download or install first application 142 (App$_1$) and second application 144 (App$_2$), manufacturer application service 140 has information about the applications installed on device 112 and the associated access requirements for those applications. Records related to the installed applications on a device may be maintained by manufacturer application service 140 or other trusted third party application service provider and/or may be maintained locally within the device's network, for example, enterprise network 110 of device 112.

Figure 3:
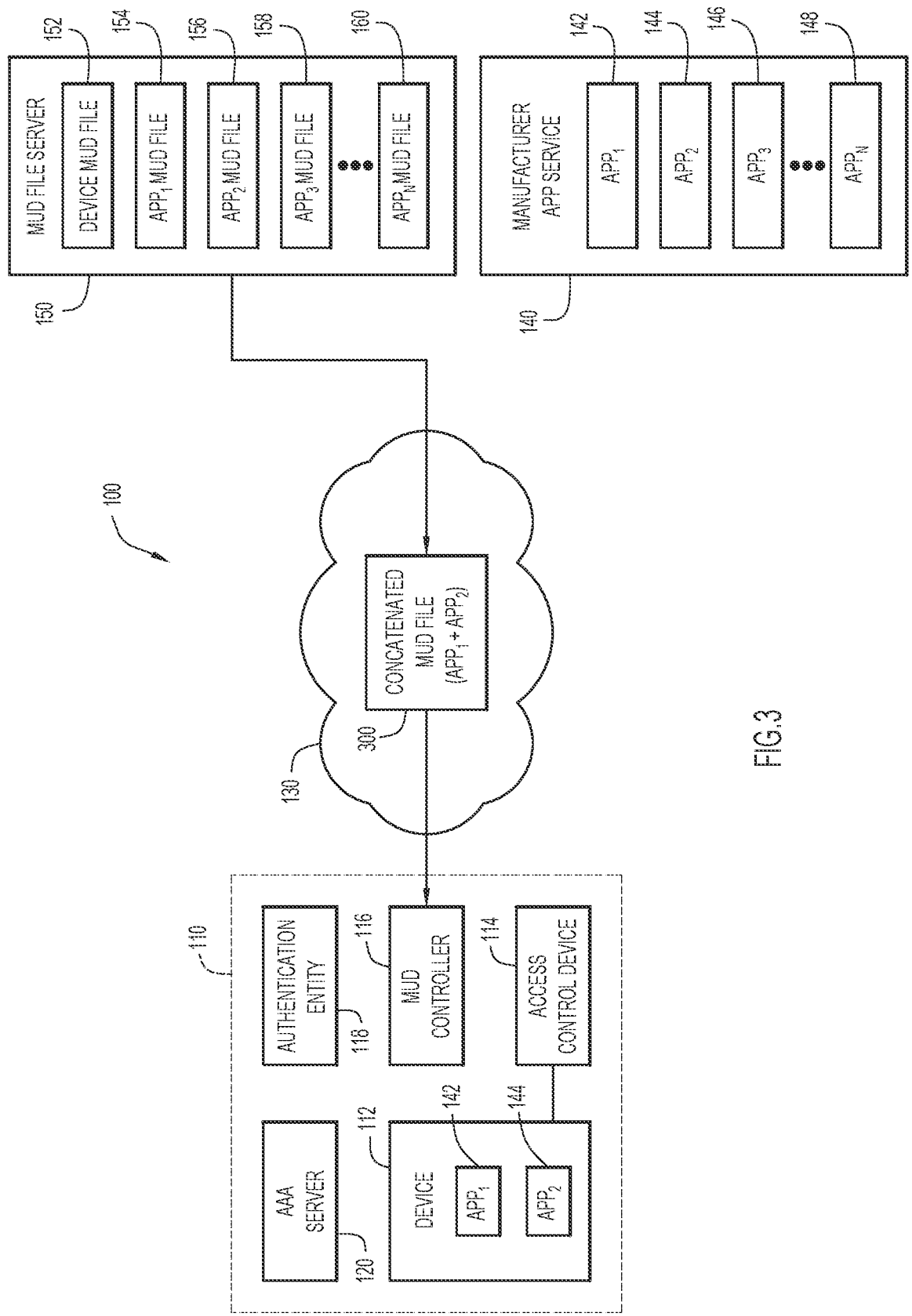
FIG. 3 is a functional diagram illustrating a concatenated MUD file being provided based on device applications, according to an example embodiment.

Referring now to FIG. 3, a functional diagram illustrating a concatenated MUD file 300 being provided to MUD controller 116 based on the applications installed on device 112 is shown according to an example embodiment. As previously described, manufacturer application service 140 has information about the applications installed on device 112 (e.g., first application 142 (App$_1$) and second application 144 (App$_2$)) and the associated access requirements for those applications. As will be described in more detail below, manufacturer application service 140 generates a concatenated MUD file that includes all of the access control permissions that device 112 requires in order to enable the functionality of the applications installed on device 112. For example, concatenated MUD file 300 includes the access control permissions that enable first application 142 (App$_1$) and second application 144 (App$_2$) to function on device 112 within enterprise network 110. In some embodiments, manufacturer application service 140 may generate a concatenated MUD file based on the aggregation of a MUD file associated with a device and the additional MUD file portions for each of the installed applications on the device. Manufacturer application service 140 can provide the concatenated MUD file for storage at MUD file server 150, where it may be retrieved by request of the appropriate MUD identifier (e.g., MUD URI). In other embodiments, a concatenated MUD file may be dynamically generated at MUD file server 150 based on information contained in a request for a MUD identifier (e.g., MUD URI).

In this embodiment, manufacturer application service 140 generates concatenated MUD file 300 that includes the combined access control permissions for device 112, first application 142 (App$_1$), and second application 144 (App$_2$)

and provides concatenated MUD file 300 to MUD file server 150 for storage. Upon obtaining (receiving) a request for concatenated MUD file 300 based on a corresponding MUD identifier (e.g., a MUD URI), MUD file server 150 may provide concatenated MUD file 300 to MUD controller 116. MUD controller 116 may then implement the access control policy of concatenated MUD file 300 by establishing appropriate access control permissions at access control device 114 for device 112 with first application 142 ($App_1$), and second application 144 ($App_2$) installed.

According to the principles of the example embodiments, a concatenated MUD file, for example, concatenated MUD file 300, may combine all of the access control permissions for the device and each application installed on that device. Accordingly, concatenated MUD files may be comprised of one or more MUD files and/or one or more MUD file portions. A MUD file may be a device MUD file, for example, MUD file 152 for device 112, and MUD file portions may be new, different, and/or additional access control permissions that are needed by a specific application to enable that application's functionality on a given device, for example, MUD file portions 154, 156, 158, 160 for applications 142, 144, 146, 148.

For example, a concatenated MUD file (e.g. concatenated MUD file 300) may include access control lists that are combined based on the device MUD file and each MUD file portion for each installed application. In this example, each access control entity listed from the access control list of each MUD file and MUD file portion is combined into a new access control list for the concatenated MUD file. Additionally, no MUD file portions from an application may contain deny actions and any duplicate access control entities in the new access control list of the concatenated MUD file are removed.

Figure 4A:
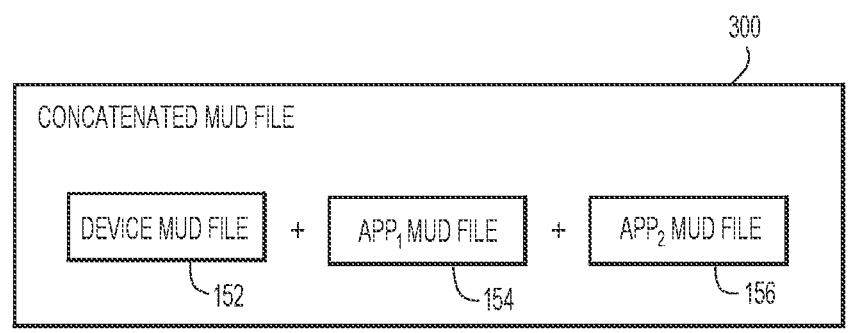
FIG. 4A is a diagram illustrating a concatenated MUD file based on aggregated MUD file portions, according to an example embodiment.

In some embodiments, concatenated MUD files may be aggregated from a plurality of pre-existing MUD files and/or MUD file portions. In other embodiments, concatenated MUD files may be dynamically generated based on the particular combination of device and installed applications. FIG. 4A shows concatenated MUD file 300 that is based on aggregated MUD files and MUD file portions, according to an example embodiment. In this embodiment, concatenated MUD file 300 comprises MUD file 152 associated with device 112 and first MUD file portion 154 associated with first application 142 ($App_1$) and second MUD file portion 156 associated with second application 144 ($App_2$). That is, concatenated MUD file 300 includes the predefined usage descriptions for device 112, as well as the new, additional, and/or different predefined usage descriptions for each application that is installed on device 112 (e.g., first application 142 ($App_1$) and second application 144 ($App_2$)). With this arrangement, concatenated MUD file 300 is configured to enable the functionality of the applications that have been installed on the device 112.

In this embodiment, two applications (e.g., first application 142 ($App_1$) and second application 144 ($App_2$)) are installed on device 112. However, the principles of the example embodiments apply to any number of applications that may be installed on a network device. In some embodiments, concatenated MUD file 300 may be generated based on a hash that identifies the particular combination of applications that have been installed on a device. For example, in an example embodiment, manufacturer application service 140 or other trusted third party application service provider may generate a hash for all combinations of applications that may be installed on a device and store a mapping of each hash to a corresponding concatenated MUD file that is comprised of the aggregated MUD file portions for each application in the combination. Each such concatenated MUD file may be stored at MUD file server 150 with a corresponding name or indicator for the file that includes the associated hash for that combination of applications that may be identified in the MUD URI. With this arrangement, when a device has a particular combination of applications installed or downloaded, the manufacturer application service 140 or other trusted third party application service provider may provide the MUD URI that contains the hash relevant for the combination of applications on the device so that the appropriate concatenated MUD file may be retrieved from MUD file server 150.

Figure 4B:
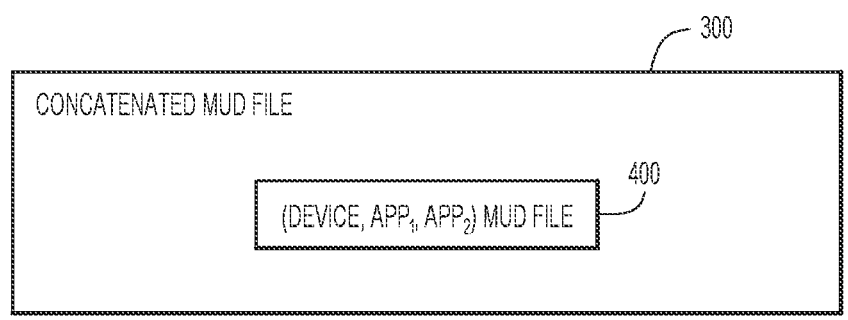
FIG. 4B is a diagram illustrating a concatenated MUD file based on dynamically generated MUD file portions, according to an example embodiment.

In other embodiments, rather than generating all possible concatenated MUD files in advance, a concatenated MUD file may be dynamically generated upon request. FIG. 4B shows an example of concatenated MUD file 300 that has been dynamically generated. In this embodiment, a MUD URI may include a hash or other information to permit identification of the device and its installed applications. As shown in the embodiment of FIG. 4B, concatenated MUD file 300 is dynamically generated using a table or other stored data as a function of the identification of the device and installed applications. For example, a table or stored data may include only a plurality of hashes representing different combinations of applications installed on one or more devices, as explained above with reference to FIG. 4A. With this arrangement, access control permissions 400 for concatenated MUD file 300 are determined dynamically as a function of the requirements of the combination of device 112, first application 142 ($App_1$), and second application 144 ($App_2$).

In some embodiments, a device may include one or more applications that are pre-loaded or pre-installed on the device by the manufacturer or a third party. In such circumstances, the device, for example, device 112, may include a certificate or other device identifier that includes a MUD identifier (e.g., a MUD URI) associated with a modified initial MUD file for the device that includes one or more MUD file portions associated with each pre-loaded or pre-installed application on the device before it is on-boarded to the network. Subsequent installations or downloads of additional applications to the device are treated in the same manner as described herein, with the device's initial MUD file being replaced with the modified initial MUD file for the purposed of generating concatenated MUD files for the additionally installed or downloaded applications.

Figure 5:
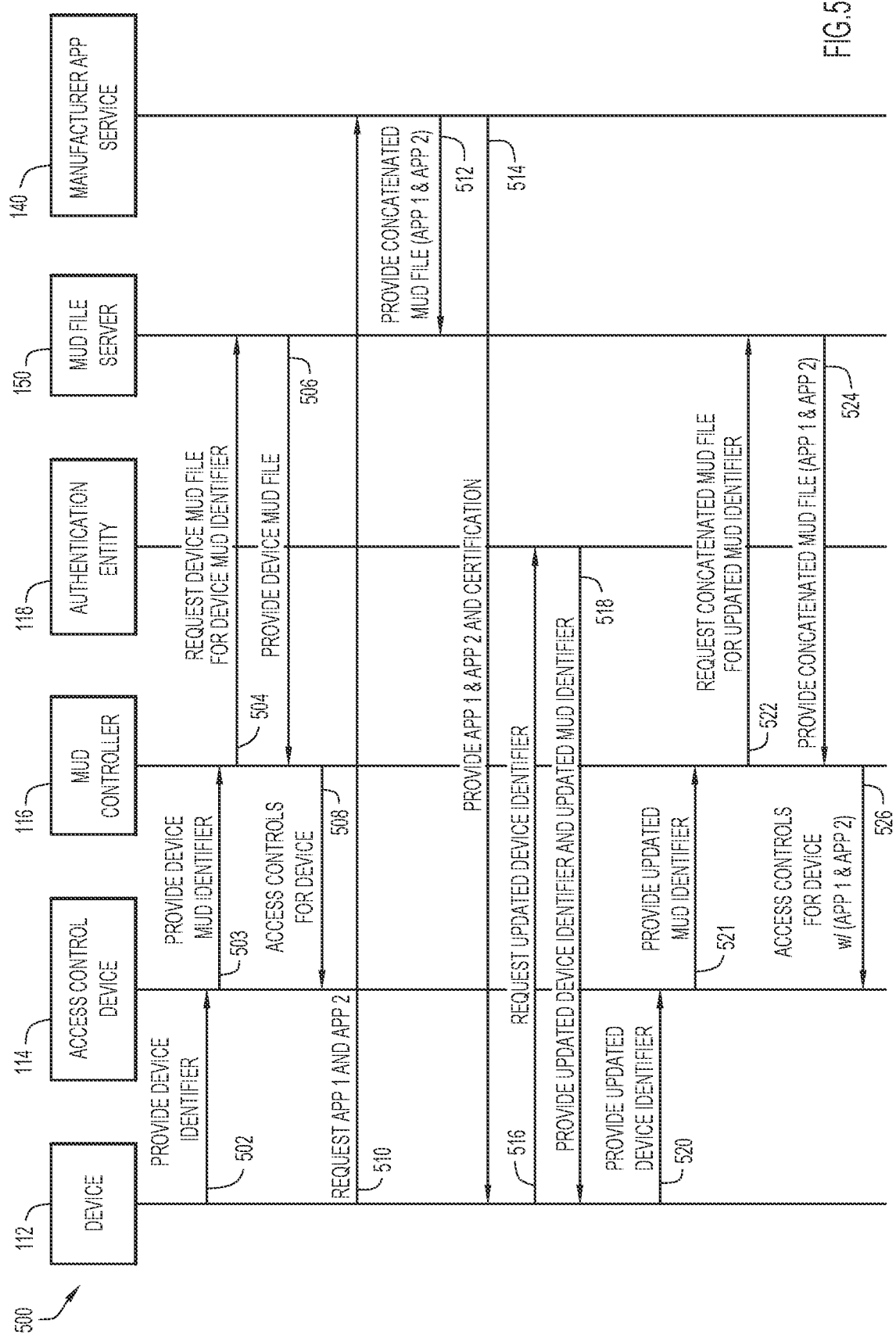
FIG. 5 is a ladder diagram illustrating operations performed by elements of the system for implementing secure modification of MUD files based on device applications, according to an example embodiment.

Referring now to FIG. 5, a sequence diagram illustrating a process 500 involving the transactional flow between elements of system 100 for implementing secure modification of MUD files based on device applications is shown according to an example embodiment. In this embodiment, process 500 begins with a network device (e.g., device 112) being installed or onboarded onto network 110. In some embodiments, device 112 may be manufactured with an initial device identifier. For example, the Institute of Electrical and Electronics Engineers (IEEE) has defined an 802.1AR standard that specifies Secure Device Identifiers (DevIDs) designed to be used as interoperable secure device authentication credentials with Extensible Authentication Protocol (EAP) and other industry standard authentication and provisioning protocols. A standardized device identity facilitates interoperable secure device authentication and simplifies secure device deployment and management.

A device with DevID capability incorporates a globally unique manufacturer provided Initial Device Identifier (IDevID), stored in a way that protects it from modification.

The device may also support the creation of Locally Significant Device Identifiers (LDevIDs) by a network administrator. Each LDevID is bound to the device in a way that makes it infeasible for it to be forged or transferred to a device with a different IDevID without knowledge of the private key used to effect the cryptographic binding. LDevIDs can incorporate, and fully protect, additional information specified by the network administrator to support local authorization conventions.

In this embodiment, device 112 may use its initial device identifier (e.g., IDevID or LDevID) with a security authentication protocol, such as Transport Layer Security (TLS), IEEE 802.1X/EAP-TLS, Internet Key Exchange (IKEv2), or other acceptable security protocol, to authenticate itself to network 110 during installation or onboarding. For example, at an operation 502, device 112 may provide its certificate or other initial device identifier to access control device 114. The initial certification for device 112, such as the initial device identifier or certificate (e.g., IDevID or LDevID), may include a MUD identifier. The MUD identifier (e.g., MUD URI) identifies the appropriate MUD file for device 112. At an operation 503, access control device 114 provides the MUD identifier (e.g., MUD URI) associated with the MUD file for the device (e.g., MUD file 152) to MUD controller 116.

At an operation 504, MUD controller 116 may use the MUD identifier (e.g., MUD URI) provided by device 112 to request the associated MUD file (e.g., MUD file 152) from MUD file server 150. At an operation 506, MUD file server 150 provides the appropriate MUD file for device 112 (e.g., MUD file 152) to MUD controller 116. At an operation 508, MUD controller 116 provides the relevant access control permissions contained in MUD file 152 to access control device 114. With this arrangement, device 112 is attached to network 110 via access control device 114 with the appropriate initial access control permissions on its ports to only permit communication that has been approved by MUD file 152.

In some embodiments, a network device, such as device 112, may be configured to download or install one or more applications to enable new, different, or additional functionalities for the device. For example, applications may be provided by manufacturer application service 140 or other trusted third party application service provider. In this embodiment, at an operation 510, device 112 requests to download or install first application 142 (App$_1$) and second application 144 (App$_2$) from manufacturer application service 140. In some embodiments, the request from device 112 may be a signed request that is accompanied by its initial device identifier (e.g., IDevID or LDevID) and/or an inventory of all applications that are installed on device 112.

An example of the signed request from device 112 to manufacturer application service 140 may be as follows:

GET /new-mud-url-from-mfgr
Content-type: application/json
{
  "signed-vendor-request": {
"my app list": [
    "AppID1",
    "AppID2",
    . . .
    "AppIDn"
  ],
  "myIDevID": "based64encodedCert here",
  "nonce": "base64encodednonce here"
  }
}

However, as described above, device 112 has been attached to network 110 via access control device 114 with the appropriate initial access control permissions on its ports to only permit communication that has been approved by MUD file 152. That is, the only approved communications for device 112 are those that were defined by the device's initial MUD file (e.g., MUD file 152) identified by the device's initial device identifier. As a result, first application 142 (App$_1$) and second application 144 (App$_2$) may not be able to initiate any communications or other functionality that was not approved by the initial access control permissions for device 112.

According to the principles of the example embodiments, therefore, the manufacturer or trusted third party application service provider provides a network device with a new or substitute certificate containing an updated MUD identifier (e.g., an updated MUD URI) that identifies the access control permissions for the device and the exact combination of applications installed on the device. The new or substitute certificate is treated by network 110 as a functional equivalent of a device identifier (e.g., IDevID) when device 112 re-authorizes itself on network 110 after downloading or installing the requested applications. With this arrangement, updated access control permissions may be provided to enable the functionality of the applications that have been installed on the device 112.

In an example embodiment, updated access control permissions for a device and its installed applications may be included in a concatenated MUD file, for example, concatenated MUD file 300, discussed above. Manufacturer application service 140 generates concatenated MUD file 300 for device 112 with first application 142 (App$_1$), and second application 144 (App$_2$) installed and, at an operation 512, provides concatenated MUD file 300 to MUD file server 150.

Next, at an operation 514, manufacturer application service 140 provides first application 142 (App$_1$) and second application 144 (App$_2$) to the requesting device, device 112. Also provided at operation 514 is a certification from manufacturer application service 140 that includes an updated MUD identifier (e.g., updated MUD URI) that is associated with concatenated MUD file 300 that includes the updated access control permissions for the combination of device 112, first application 142 (App$_1$), and second application 144 (App$_2$).

An example of the certification provided from manufacturer application service 140 to device 112 may be as follows:

Content-type: application/json
{
  "signed-manufacturer-voucher": {
    "new-mud-url": "https://{somenewURLhere}",
    "your-nonce": "{return value from above}",
    "my-nonce": "based64encodednonce here"
  }
}

As described above, because the device's initial MUD file (e.g., MUD file 152) identified by the device's initial device identifier granted only specific access control permissions to the device, first application 142 (App$_1$) and second application 144 (App$_2$) may not be able to initiate any communications or enable other functionality. At an operation 516, device 112 requests an updated device identifier (e.g., an updated DevID) from a trusted entity, for example, authentication entity 118, that includes the updated MUD identifier (e.g., updated MUD URI) that is associated with concatenated MUD file 300 that includes the updated access control permissions for the combination of device 112, first application 142 (App$_1$), and second application 144 (App$_2$).

For example, at operation 516, device 112 may include its initial device identifier (e.g., IDevID or LDevID) and the certification from manufacturer application service 140 that includes an updated MUD identifier (e.g., updated MUD URI), which was provided to device 112 at operation 514, above. Authentication entity 118, for example, a BRSKI registrar, may use the initial device identifier from device 112 along with the certification from manufacturer application service 140 that has a pre-established trust relationship with authentication entity 118, to provide an updated device identifier (e.g., updated DevID) to device 112 at an operation 518. In this embodiment, the updated device identifier (e.g., updated DevID) includes the updated MUD identifier (e.g., updated MUD URI) that is associated with concatenated MUD file 300.

An example of a request from device 112 for an updated device identifier from authentication entity 118 may be as follows:

POST /new-ldevid-mudurl
Content-type: application/json
{
  "signed-vendor-request": {
    "signed-manufacturer-voucher": "base64encoded signed-manufacturer-voucher",
    "myIDevID": "based64encodedCert here",
    "myLDevID": "based64encodedCert here",
  "newcert": "base64encoded csr as described in RFC 7020 reenroll",
    "nonce": "base64encodednonce here"
  }
}

Upon receiving its updated device identifier (e.g., updated DevID) with the updated MUD identifier (e.g., updated MUD URI), at an operation 520, device 112 may re-authenticate itself on network 110. Accordingly, at operation 520, device 112 provides its updated device identifier (e.g., updated DevID) to access control device 114. At an operation 521, access control device 114 provides the updated MUD identifier (e.g., updated MUD URI) to MUD controller 116. At an operation 522, MUD controller 116 uses the updated MUD identifier (e.g., updated MUD URI) included with the updated device identifier (e.g., updated DevID) to request concatenated MUD file 300 from MUD file server 150.

At an operation 524, MUD file server 150 provides the appropriate concatenated MUD file for the combination of device 112, first application 142 (App$_1$), and second application 144 (App$_2$) (e.g., concatenated MUD file 300) to MUD controller 116. At an operation 526, MUD controller 116 provides the updated access control permissions contained in concatenated MUD file 300 to access control device 114. With this arrangement, device 112 with first application 142 (App$_1$) and second application 144 (App$_2$) installed is attached to network 110 via access control device 114 with the appropriate updated access control permissions on its ports to enable communications or other functionality for the combination of device 112, first application 142 (App$_1$), and second application 144 (App$_2$).

Figure 6:
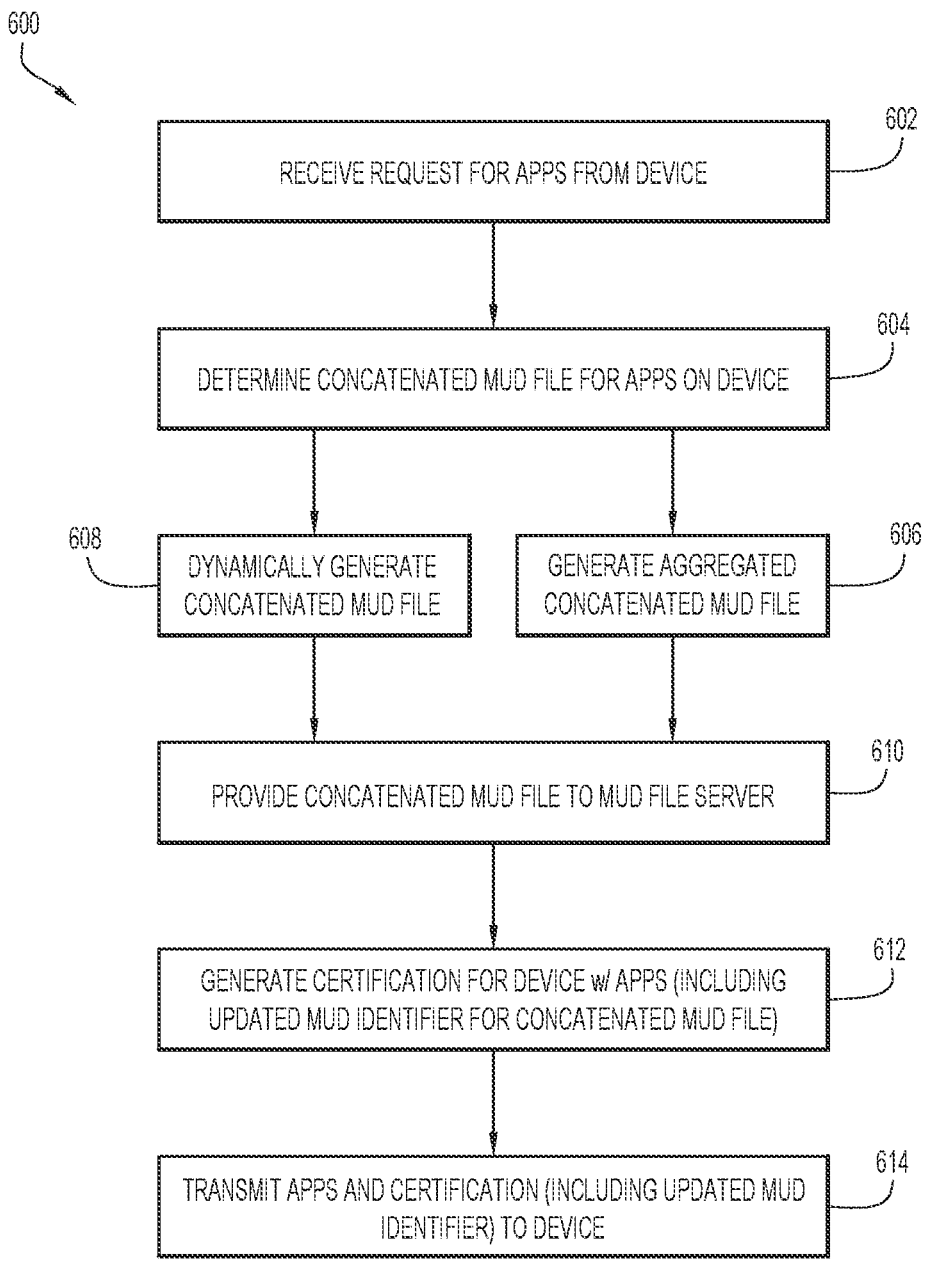
FIG. 6 is a flowchart illustrating a method of secure modification of MUD files based on device applications, according to an example embodiment.

FIG. 6 is a flowchart illustrating a method 600 of secure modification of MUD files based on device applications, according to an example embodiment. In some embodiments, method 600 may be implemented by an apparatus providing a manufacturer application service or trusted third party application service provider, which may be a server or other device configured to provide applications for various devices, for example, manufacturer application service 140. Method 600 may be described in reference to FIGS. 1-5, detailed above. In this embodiment, method 600 includes an operation 602 where a request for one or more applications is received from a device. For example, as described above, device 112 may request to download or install first application 142 (App$_1$) and second application 144 (App$_2$) from manufacturer application service 140.

Next, at an operation 604, a concatenated MUD file is determined for the device based on the applications installed on the device. For example, manufacturer application service 140 may generate concatenated MUD file 300 for device 112 based on the combination of first application 142 (App$_1$) and second application 144 (App$_2$) installed on device 112. As described above in reference to FIGS. 4A and 4B, concatenated MUD files may be generated at an operation 606 by aggregating a MUD file associated with a device and one or more MUD files portions associated with applications installed on the device (described in reference to FIG. 4A), or may be dynamically generated at an operation 608 as a function of the device and the combination of applications installed on the device (described in reference to FIG. 4B). In some cases, where there are a large number of installed applications or potential applications, it may be more efficient to dynamically generate concatenated MUD files upon receiving a request (e.g., operation 608) rather than generating concatenated MUD files by aggregating the various MUD file portions with device MUD files (e.g., operation 606).

Next, at an operation 610, the concatenated MUD file is provided to the MUD file server so as to be available upon request by identification of the MUD identifier (e.g., MUD URI) for that specific concatenated MUD file. For example, manufacturer application service 140 may provide concatenated MUD file 300 to MUD file server 150.

At an operation 612, the manufacturer application service may generate a certification or an assertion for the requesting device that includes the updated MUD identifier (e.g., updated MUD URI) for that the concatenated MUD file. For example, the certification provided by manufacturer application service 140 to device 112 at operation 514 of FIG. 5 above.

Next, at an operation 614, the applications requested by the device at operation 602 are provided along with the certification that includes the updated MUD identifier (e.g., updated MUD URI) for that the concatenated MUD file that includes the access control permissions for the combination of the device and the installed applications (e.g., device 112 with first application 142 (App$_1$) and second application 144 (App$_2$) installed).

Method 600 may end upon transmitting the requested applications and certification to the requesting device. In some embodiments, method 600 may begin again upon the receipt of a new request for one or more applications at operation 602. The new request may be from the same device requesting additional applications or may be from a new device.

It should be understood that MUD files may contain additional information not explicitly described herein. For example, a concatenated MUD file for a network device in the may appear as follows:

```
{
    "ietf-mud:mud": {
        "mud-url": "https://merged.app.example.com/.well-known/mud/v1/app-merged",
        "last-update": "2017-09-18T12:29:31+02:00",
        "systeminfo": "https://merged.app.example.com/docs/app-merged",
        "cache-validity": 48,
        "from-device-policy": {
            "access-lists": {
                "access-list": [
                    {
                        "acl-name": "mud-23957-v4fr",
                        "acl-type": "ietf-access-control-list:ipv4-acl"
                    }
                ]
            }
        },
        "to-device-policy": {
            "access-lists": {
                "access-list": [
                    {
                        "acl-name": "mud-23957-v4to",
                        "acl-type": "ietf-access-control-list:ipv4-acl"
                    }
                ]
            }
        }
    },
    "ietf-access-control-list:access-lists": {
        "acl": [
            {
                "acl-name": "mud-23957-v4to",
                "acl-type": "ipv4-acl",
                "aces": {
                    "ace": [
                        {
                            "rule-name": "cl0-todev",
                            "matches": {
                                "ipv4-acl": {
                                    "ietf-acldns:src-dnsname": "app2.cloud.example.com"
                                },
                                "protocol": 6,
                                "source-port-range": {
                                    "lower-port": 443,
                                    "upper-port": 443
                                },
                                "tcp-acl": {
                                    "ietf-mud:direction-initiated": "from-device"
                                }
                            },
                            "actions": {
                                "permit": [
                                    null
                                ]
                            }
                        },
                        {
                            "rule-name": "cl1-todev",
                            "matches": {
                                "ipv4-acl": {
                                    "ietf-acldns:src-dnsname": "app1.example.com"
                                },
                                "protocol": 6,
                                "tcp-acl": {
                                    "ietf-mud:direction-initiated": "from-device"
                                }
                            },
                            "actions": {
                                "permit": [
                                    null
                                ]
                            }
                        }
                    ]
                }
            },
            {
                "acl-name": "mud-23957-v4fr",
                "acl-type": "ipv4-acl",
                "aces": {
                    "ace": [
```

```
            {
                "rule-name": "cl0-frdev",
                "matches": {
                    "ipv4-acl": {
                        "ietf-acldns:dst-dnsname": "app2.cloud.example.com"
                    },
                    "protocol": 6,
                    "destination-port-range": {
                        "lower-port": 443,
                        "upper-port": 443
                    },
                    "tcp-acl": {
                        "ietf-mud:direction-initiated": "from-device"
                    }
                },
                "actions": {
                    "permit": [
                        null
                    ]
                }
            },
            {
                "rule-name": "cl1-frdev",
                "matches": {
                    "ipv4-acl": {
                        "ietf-acldns:dst-dnsname": "app1.example.com"
                    },
                    "protocol": 6,
                    "tcp-acl": {
                        "ietf-mud:direction-initiated": "from-device"
                    }
                },
                "actions": {
                    "permit": [
                        null
                    ]
                }
            }
        ]
    }
  }
 ]
 }
}
```

The principles of the example embodiments described above may also be applied to secure modification of MUD files based on installation of accessory devices to a device. For example, in some embodiments, a device may install or add an accessory device that includes additional or different functionality to the device. As described above, device 112 has been attached to network 110 via access control device 114 with the appropriate initial access control permissions on its ports to only permit communication that has been approved by MUD file 152. That is, the only approved communications for device 112 are those that were defined by the device's initial MUD file (e.g., MUD file 152) identified by the device's initial device identifier. As a result, accessory devices added or installed to device 112 may not be able to initiate any communications or other functionality that was not approved by the initial access control permissions for device 112.

In such embodiments, the newly added or installed accessory devices may be treated in a similar manner as described above with regard to adding new applications to device 112 and securely modifying a MUD file in accordance with the accessory devices. In one embodiment, an accessory device may include an associated application. For example, an accessory device may include an application specific to that accessory device that may be obtained from a manufacturer application service (e.g., manufacturer application service 140) or other trusted third party application service provider.

In this embodiment, the new, different, and/or additional functionality provided to the device by the accessory device may be enabled by generating a concatenated MUD file, as described above, that combines the device's initial MUD file with a MUD file portion that is associated with the accessory device application. With this arrangement, updated access control permissions may be provided to enable the functionality of the accessory device that has been installed on device 112.

In another embodiment, an accessory device may not have an associated application. In such embodiments, installing or adding the accessory device to the device may cause the device to install or download a device driver for the accessory device. For example, device 112 may install an accessory device, which triggers device 112 to install an associated driver for the accessory device that is either already included on device 112 or that is retrieved from an outside source, such as from a manufacturer application service (e.g., manufacturer application service 140) or other trusted third party application service provider.

In this embodiment, the driver for the accessory device includes a MUD identifier (e.g., MUD URI) that is associated with an applicable MUD file portion associated with the accessory device. In this situation, the MUD file portion associated with the accessory device may be treated in a similar manner as the MUD file portions for the one or more applications, as described above. Accordingly, a concatenated MUD file may be generated based on the device's MUD file and the MUD file portion associated with the accessory device. With this arrangement, updated access control permissions may be provided to enable the functionality of the accessory device that has been installed on device 112.

Figure 7:
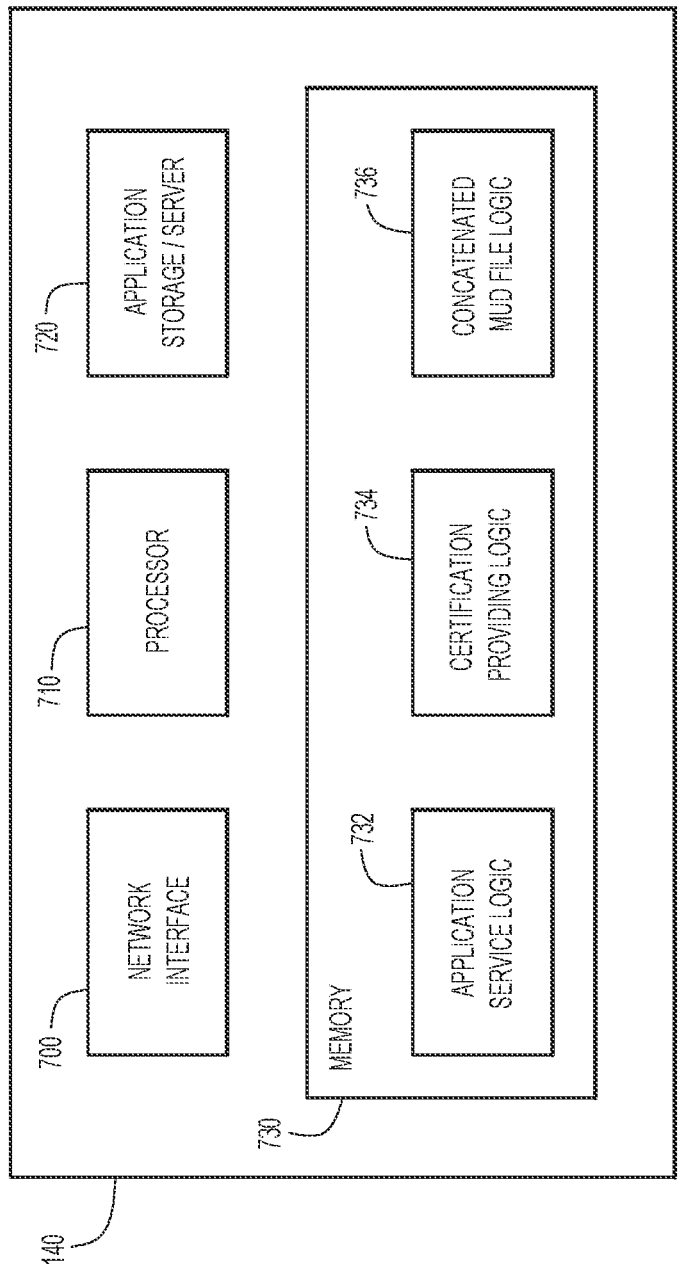
FIG. 7 is a block diagram of a manufacturer application service apparatus for implementing secure modification of MUD files based on device applications, according to an example embodiment.

FIG. 7 illustrates an example embodiment of an apparatus of manufacturer application service 140 upon which the embodiments presented herein for secure modification of MUD files based on device applications may be implemented. This manufacturer application service 140 may reside in a remote server or network located apart from enterprise network 110, and perform the operations described above with respect to FIGS. 1-6.

As shown in FIG. 7, manufacturer application service 140 includes a network interface 700, a processor 710 for processing information and may further include a bus (not shown) or other communication mechanism coupled with processor 710 for communicating the information. The network interface 700 may be, for example, one or more network interface cards configured to enable network communications. While the figure shows a single block 710 for a processor, it should be understood that the processor 710 may represent a plurality of processing cores, each of which can perform separate processing.

Manufacturer application service 140 includes an application storage device or server 720 that stores applications and other programs that may be requested by devices for downloading and/or installation to enable new, different, and/or additional functionality to the device. Manufacturer application service 140 also includes a main memory 730, such as a random access memory (RAM) or other dynamic storage device (e.g., dynamic RAM (DRAM), static RAM (SRAM), and synchronous DRAM (SD RAM)), coupled to the bus for storing information and instructions to be executed by processor 710. For example, application service logic 732, certification providing logic 734, and/or concatenated MUD file logic 736 is stored in memory 730 for providing one or more of the functions of manufacturer application service 140 described herein. In addition, main memory 730 may be used for storing temporary variables or other intermediate information during the execution of instructions by processor 710.

Manufacturer application service 140 may further include other components not explicitly shown or described in the example embodiments. For example, manufacturer application service 140 may include a read only memory (ROM) or other static storage device (e.g., programmable ROM (PROM), erasable PROM (EPROM), and electrically erasable PROM (EEPROM)) coupled to the bus for storing static information and instructions for processor 710. Manufacturer application service 140 may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the manufacturer application service 140 using an appropriate device interface (e.g., small computer system interface (SCSI), integrated device electronics (IDE), enhanced-IDE (E-IDE), direct memory access (DMA), or ultra-DMA).

Manufacturer application service 140 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

Manufacturer application service 140 performs a portion or all of the processing steps of the process in response to processor 710 executing one or more sequences of one or more instructions contained in a memory, such as main memory 730. Such instructions may be read into main memory 730 from another computer readable medium, such as a hard disk or a removable media drive. One or more processors in a multi-processing arrangement may also be employed to execute the sequences of instructions contained in main memory 730. In alternative embodiments, hard-wired circuitry may be used in place of or in combination with software instructions. Thus, embodiments are not limited to any specific combination of hardware circuitry and software.

As stated above, manufacturer application service 140 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling manufacturer application service 140, for driving a device or devices for implementing the process, and for enabling manufacturer application service 140 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The principles of the example embodiments described herein provide a mechanism for a manufacturer or trusted application provider to certify network behaviors based on the applications installed on a device by having the device communicate with the manufacturer or trusted application provider. The manufacturer or trusted application provider can determine what applications are installed on the device and what kind of access the device requires to enable the functionality of the installed applications. The manufacturer can then aggregate appropriate rule in a new MUD file (e.g. a concatenated MUD file) that it hands back to the device. The device can then re-register itself on the network to establish the change in authorization reflected by the new MUD file.

In summary, a method is provided comprising: obtaining (receiving) a manufacturer usage description (MUD) identifier from a first device; retrieving a MUD file associated with the MUD identifier; registering a device identifier associated with the first device with a delegated controller determined based on the MUD file, wherein the delegated controller is configured to generate a dynamic policy for the first device; obtaining (receiving) a dynamic policy from the delegated controller for the first device, the dynamic policy configured to permit a communication session between the first device and at least one second device; and providing (forwarding) the dynamic policy to an access control device in communication with the first device to enable the access control device to permit the communication session between the first device and the at least one second device.

In another form, a non-transitory computer readable storage media is provided that is encoded with instructions which, when executed by a processor, cause the processor to perform operations including: obtaining (receiving) a manufacturer usage description (MUD) identifier from a first device; retrieving a MUD file associated with the MUD identifier; registering a device identifier associated with the first device with a delegated controller determined based on the MUD file, wherein the delegated controller is configured to generate a dynamic policy for the first device; obtaining (receiving) a dynamic policy from the delegated controller for the first device, the dynamic policy configured to permit a communication session between the first device and a second device; and providing (forwarding) the dynamic policy to an access control device in communication with the first device to enable the access control device to permit the communication session between the first device and the second device.

In addition, a method is provided comprising: obtaining (receiving) a request for one or more applications from a device; providing (transmitting) to the device the one or more applications and a certification that includes an updated manufacturer usage description (MUD) identifier determined based on the one or more applications requested; wherein the updated MUD identifier is associated with a concatenated MUD file that comprises individual MUD file portions for each of the one or more applications requested; and wherein the device is configured to request an updated device identifier using the certification, and wherein the updated device identifier includes the updated MUD identifier that is associated with the concatenated MUD file.

Furthermore, an apparatus is provided comprising: a communication interface configured to enable network communications; and a processor coupled with the communication interface, and configured to: obtain (receive) a request for one or more applications from a device; provide (transmit) to the device the one or more applications and a certification that includes an updated manufacturer usage description (MUD) identifier determined based on the one or more applications requested; wherein the updated MUD identifier is associated with a concatenated MUD file that comprises individual MUD file portions for each of the one or more applications requested; and wherein the device is configured to request an updated device identifier using the certification, and wherein the updated device identifier includes the updated MUD identifier that is associated with the concatenated MUD file.

Further still, a system is provided comprising: at least one device; an access control device in communication with the at least one device, the access control device being configured to enforce access control permissions on a communication network for the at least one device; an authenticator entity in communication with the at least one device, the authenticator entity configured to provide device identifiers; a manufacturer application service apparatus in communication with the at least one device, the manufacturer application service apparatus comprising a communication interface configured to enable network communications on the communication network, and a processor coupled with the communication interface, and configured to: obtain (receive) a request for one or more applications from the at least one device; provide (transmit) to the at least one device the one or more applications and a certification that includes an updated manufacturer usage description (MUD) identifier determined based on the one or more applications requested; wherein the updated MUD identifier is associated with a concatenated MUD file that comprises individual MUD file portions for each of the one or more applications requested; and wherein the at least one device is configured to request an updated device identifier from the authenticator entity using the certification, and wherein the updated device identifier includes the updated MUD identifier that is associated with the concatenated MUD file.

Moreover, in another form, a non-transitory computer readable storage media is provided that is encoded with instructions which, when executed by a processor, cause the processor to perform operations including: obtaining (receiving) a request for one or more applications from a device; providing (transmitting) to the device the one or more applications and a certification that includes an updated manufacturer usage description (MUD) identifier determined based on the one or more applications requested; wherein the updated MUD identifier is associated with a concatenated MUD file that comprises individual MUD file portions for each of the one or more applications requested; and wherein the device is configured to request an updated device identifier using the certification, and wherein the updated device identifier includes the updated MUD identifier that is associated with the concatenated MUD file.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   determining one or more applications that are installed on a device, the device having associated therewith a first device identifier; and
   generating a certification that includes an updated manufacturer usage description (MUD) identifier determined based on the one or more applications, wherein the updated MUD identifier is associated with a concatenated MUD file that comprises at least two individual MUD file portions that at least in part are based on the one or more applications installed on the device,
   wherein the first device identifier includes a first MUD identifier that is associated with a first MUD file for the device, the first MUD file being different from the concatenated MUD file.

2. The method of claim 1, wherein the concatenated MUD file is configured to provide access control permissions for the device.

3. The method of claim 2, wherein the access control permissions are enforced by an access control device in communication with the device.

4. The method of claim 1, wherein the one or more applications include at least a first application and a second application, and wherein the concatenated MUD file comprises at least a first MUD file portion associated with the first application and a second MUD file portion associated with the second application.

5. The method of claim 1, further comprising dynamically generating the concatenated MUD file based on the updated MUD identifier.

6. The method of claim 1, wherein the updated MUD identifier is a modified initial MUD file for the device and is different from an initial MUD file based on the one or more applications pre-loaded on the device.

7. The method of claim 1, further comprising:
obtaining a request for one or more applications, from the device, via a communication network to which the device is attached with one or more access control permissions specified in an initial MUD file identified by an initial MUD identifier.

8. The method of claim 1, wherein the device is an Internet of Things device that is embedded with information to identify a location of an initial MUD file different from the concatenated MUD file.

9. The method of claim 1, wherein the at least two individual MUD file portions include one or more network policies regarding communications of each of the one or more applications.

10. An apparatus comprising:
a communication interface configured to enable network communications; and
a processor coupled with the communication interface, and configured to:
determine one or more applications that are installed on a device, the device having associated therewith a first device identifier; and
generate a certification that includes an updated manufacturer usage description (MUD) identifier determined based on the one or more applications, wherein the updated MUD identifier is associated with a concatenated MUD file that comprises at least two individual MUD file portions that at least in part are based on the one or more applications installed on the device,
wherein the first device identifier includes a first MUD identifier that is associated with a first MUD file for the device, the first MUD file being different from the concatenated MUD file.

11. The apparatus of claim 10, wherein the concatenated MUD file is configured to provide access control permissions for the device.

12. The apparatus of claim 11, wherein the access control permissions are enforced by an access control device in communication with the apparatus via the communication interface.

13. The apparatus of claim 10, wherein the one or more applications include at least a first application and a second application, and
wherein the concatenated MUD file comprises at least a first MUD file portion associated with the first application and a second MUD file portion associated with the second application.

14. The apparatus according to claim 10, wherein the processor is further configured to dynamically generate the concatenated MUD file based on the updated MUD identifier.

15. The apparatus of claim 10, wherein the processor is further configured to:
obtaining a request for one or more applications, from the device, via a communication network to which the device is attached with one or more access control permissions specified in an initial MUD file identified by an initial MUD identifier.

16. The apparatus of claim 10, wherein the at least two individual MUD file portions include one or more network policies regarding communications of each of the one or more applications.

17. A system comprising:
at least one device;
an access control device in communication with the at least one device, the access control device being configured to enforce access control permissions on a communication network for the at least one device;
an authenticator entity in communication with the at least one device, the authenticator entity configured to provide device identifiers; and
a manufacturer application service apparatus in communication with the at least one device, the manufacturer application service apparatus comprising a communication interface configured to enable network communications on the communication network, and a processor coupled with the communication interface, and configured to:
determine one or more applications that are installed on the at least one device, the at least one device having associated therewith a first device identifier; and
generate a certification that includes an updated manufacturer usage description (MUD) identifier determined based on the one or more applications, wherein the updated MUD identifier is associated with a concatenated MUD file that comprises at least two individual MUD file portions that at least in part are based on the one or more applications installed on the at least one device,
wherein the first device identifier includes a first MUD identifier that is associated with a first MUD file for the at least one device, the first MUD file being different from the concatenated MUD file.

18. The system according to claim 17, wherein the at least one device is configured to request an updated device identifier from the authenticator entity using the certification, and wherein the updated device identifier includes the updated MUD identifier that is associated with the concatenated MUD file.

19. The system according to claim 17, wherein the access control device is configured to provide access control permissions for the at least one device based on the concatenated MUD file.

20. The system according to claim 17, wherein the one or more applications include at least a first application and a second application, and
wherein the concatenated MUD file comprises at least a first MUD file portion associated with the first application and a second MUD file portion associated with the second application.

* * * * *